(12) United States Patent
Bartoli et al.

(10) Patent No.: US 12,246,563 B2
(45) Date of Patent: Mar. 11, 2025

(54) TYRE-CHANGING MACHINE

(71) Applicant: SICAM S.r.l., Correggio (IT)

(72) Inventors: Pietro Bartoli, Reggio Emilia (IT); Lelio Farina, Reggio Emilia (IT)

(73) Assignee: SICAM S.R.L., Correggio (IT)

( * ) Notice: Subject to any disclaimer, the term of this patent is extended or adjusted under 35 U.S.C. 154(b) by 369 days.

(21) Appl. No.: 17/772,870

(22) PCT Filed: Oct. 26, 2020

(86) PCT No.: PCT/IB2020/060021
§ 371 (c)(1),
(2) Date: Apr. 28, 2022

(87) PCT Pub. No.: WO2021/084398
PCT Pub. Date: May 6, 2021

(65) Prior Publication Data
US 2023/0031357 A1 Feb. 2, 2023

(30) Foreign Application Priority Data
Oct. 28, 2019 (IT) .................. 102019000019864

(51) Int. Cl.
*B60C 25/05* (2006.01)
*B60C 25/138* (2006.01)

(52) U.S. Cl.
CPC ........ *B60C 25/0578* (2013.01); *B60C 25/138* (2013.01)

(58) Field of Classification Search
CPC .. B60C 25/132; B60C 25/138; B60C 25/0578
See application file for complete search history.

(56) References Cited

U.S. PATENT DOCUMENTS

| | | | | |
|---|---|---|---|---|
| 7,497,761 | B2 * | 3/2009 | Gonzaga | B60C 25/0578 451/14 |
| 9,067,467 | B2 * | 6/2015 | Corghi | B60C 25/0506 |
| 9,132,706 | B2 * | 9/2015 | Bonacini | G01M 1/045 |
| 9,199,519 | B2 * | 12/2015 | Bonacini | B60C 25/138 |

(Continued)

FOREIGN PATENT DOCUMENTS

| | | |
|---|---|---|
| EP | 1177920 A2 | 2/2002 |
| EP | 1714807 A1 | 10/2006 |

(Continued)

OTHER PUBLICATIONS

International Search Report for PCT/IB2020/060021 dated Dec. 10, 2020 (2 pages).

*Primary Examiner* — David B. Thomas
(74) *Attorney, Agent, or Firm* — Tutunjian & Bitetto, P.C.

(57) ABSTRACT

The present invention concerns a tyre-changing machine provided with a basic structure that can rest on the ground, a retaining and rotation unit mounted on an upper part of the structure and adapted to retain and set the rim (C) of a wheel (R) in rotation around an axis of rotation of the wheel (Z-Z) and a holding column associated with the retaining and rotation unit and intended to support a tool for mounting/disassembling a tyre (P) onto/from the rim (C) of the wheel (R). Advantageously, the tool comprises a hooked end which can rotate passively around an axis of rotation (X-X) orthogonal to the axis of rotation of the wheel (Z-Z).

11 Claims, 6 Drawing Sheets

(56) References Cited

U.S. PATENT DOCUMENTS

| | | | | |
|---|---|---|---|---|
| 9,707,810 B2* | 7/2017 | Gonzaga | ............. | B60C 25/0506 |
| 10,065,462 B2* | 9/2018 | Gonzaga | ............. | B60C 25/0563 |
| 10,189,322 B2* | 1/2019 | Gonzaga | ............. | B60C 25/0524 |
| 10,252,586 B2* | 4/2019 | Mariani | ............. | B60C 25/0593 |
| 11,001,108 B2* | 5/2021 | Sotgiu | ................ | B60C 25/0578 |
| 11,214,103 B2* | 1/2022 | Sotgiu | ................ | B60C 25/0554 |
| 2001/0052396 A1* | 12/2001 | Vignoli | ............... | B60C 25/0569 |
| | | | | 157/1.22 |
| 2010/0089538 A1 | 4/2010 | Bonacini | | |
| 2014/0034248 A1* | 2/2014 | Gonzaga | ............. | B60C 25/0593 |
| | | | | 157/1.1 |
| 2015/0343863 A1* | 12/2015 | Sotgiu | ................ | B60C 25/0578 |
| | | | | 157/1.24 |
| 2016/0129739 A1* | 5/2016 | Mariani | ................ | B60C 25/138 |
| | | | | 157/1.24 |
| 2018/0194179 A1* | 7/2018 | Ferrari | ................ | B60C 25/0578 |
| 2020/0398619 A1* | 12/2020 | Corghi | ................ | B60C 25/0518 |

FOREIGN PATENT DOCUMENTS

| | | | |
|---|---|---|---|
| EP | 1593533 | A3 | 11/2006 |
| EP | 1944177 | A1 | 7/2008 |
| EP | 3315331 | A1 | 5/2018 |
| IT | 1332037 | | 9/2002 |

\* cited by examiner

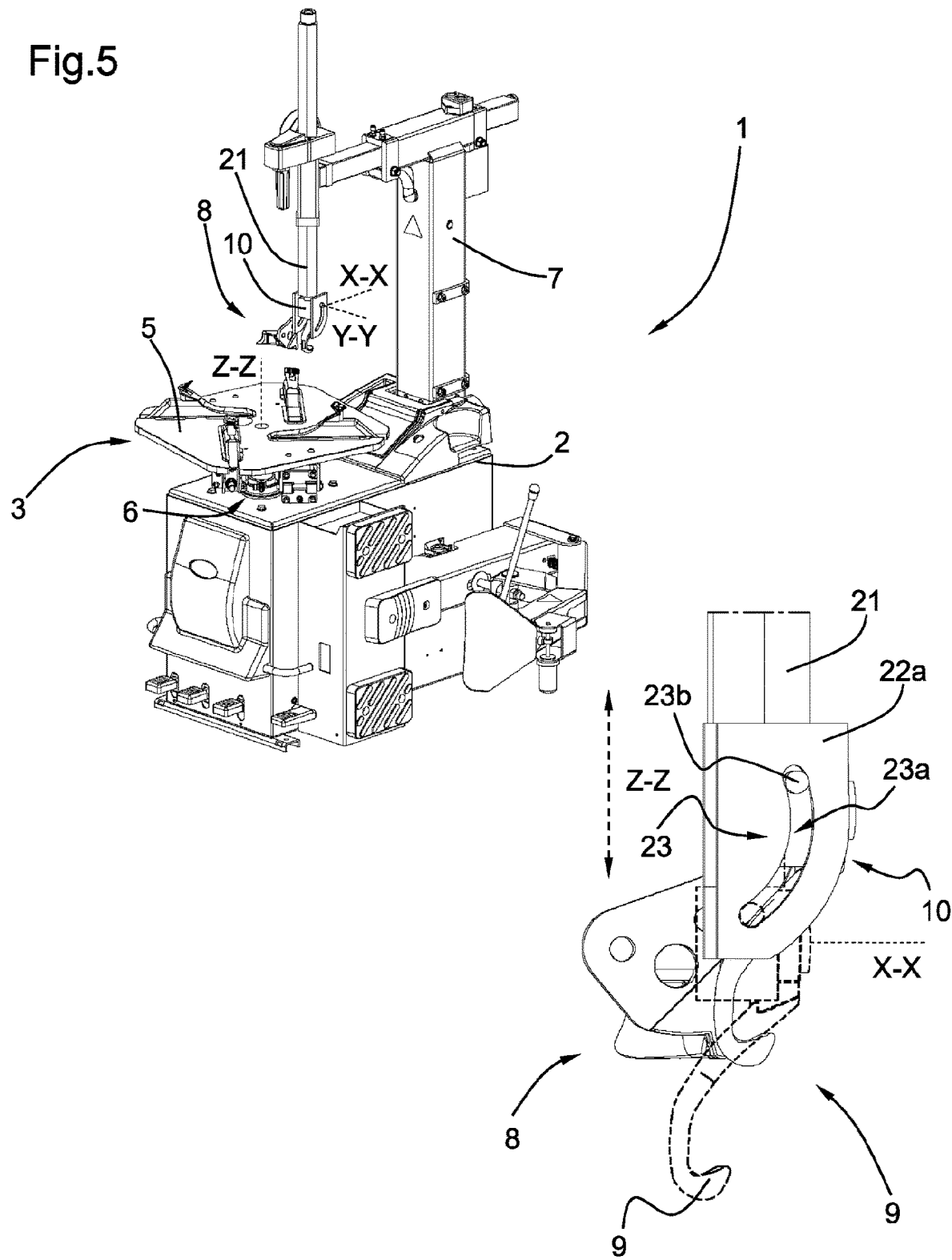

TYRE-CHANGING MACHINE

TECHNICAL FIELD

The present invention relates to a tyre-changing machine.

BACKGROUND ART

It is well known that tyre-changing machines are used to remove and assemble the tyre from/to the relevant rim in order to repair or replace it.

An example of a known type of tyre-changing machine involves the presence of a basic framework to support a wheel retaining and rotation unit, a holding column that rises from the framework and a tool holding arm mounted on the column to be able to shift vertically and horizontally in approach towards the wheel.

The tool holding arm or the holding column generally supports a tool intended to disassemble and/or assemble the tyre. The tool is used for the disassembly by engaging the bead to grasp and lift it so that it is pulled out over a ring-shaped rim flap.

In use, after a preliminary bead-breaking phase of the tyre, an operator positions and locks the wheel on the retaining and rotation means.

The tool is then approached to the wheel, until it abuts against and presses the side of the tyre, introducing one of its ends, usually hooked, between the bead of the tyre and the rim.

Next, the tool is moved vertically away from the wheel so that the portion of the bead affected by the tool is pulled out of the rim. At this point, the wheel is set in rotation around its own vertical axis to allow the entire bead to come out of the rim. At the end, the unit stops and the operator unloads the disassembled tyre, then loads another one to mount it on the rim. After it has been assembled, the complete wheel of the new tyre is in turn unloaded by the operator.

There are numerous types of hooked ends that make it easier to pull the bead out of the rim.

A first type provides for the hooked end to be movable locked together with the tool holding arm in order to exert radial forces on the bead to space it apart from the rim, thus facilitating its coming out by means of, e.g., the combination of horizontal and/or vertical movements of the arm.

An example of this first type of tool is shown in patent document IT1332037.

A second type requires, on the other hand, the hooked end to be movable relative to the tool holding arm. For this purpose, by using special movable supports, it is possible to change the inclination of the hooked end or to obtain more complex movements by using. e.g., articulated quadrilaterals, levers or slots.

Some examples of this second type of tools are shown in patent documents EP1177920, EP3315331, EP1593533, EP1944177 and US2010/0089538.

The above mentioned solutions, although they are aimed at stretching and/or stressing the tyre bead less during its pulling out, however, provide for the hooked end to be always and only moved towards the wheel and, therefore, relative to the edge of the rim, to move within a vertical plane passing through the axis of the wheel.

SUMMARY OF THE INVENTION

The Applicant realized that, in actual facts, the bead edge of the tyre could be subjected to even less stress if the hooked end was free from further movement during wheel rotation. A new solution was therefore devised in which the hooked end would improve its smoothness relative to the bead T, thanks to the possibility of passively adapting its inclination depending on the increase or decrease in the friction forces normally created when the wheel is rotated between the bead itself and the hooked end.

The Applicant has therefore devised a tyre-changing machine provided with a hooked end that can passively rotate around its own axis perpendicular to the axis of rotation of the wheel, thus allowing to operate in a more delicate manner on the bead and at the same time facilitating the coming out of the tyre.

The present invention therefore relates to a tyre-changing machine according to the present application having structural and functional characteristics such as to meet the above mentioned requirements and at the same time to overcome the above mentioned drawbacks with reference to the prior art.

BRIEF DESCRIPTION OF THE DRAWINGS

Other characteristics and advantages of the present invention will be more evident from the description of a preferred, but not exclusive, embodiment of a tyre-changing machine, illustrated by way of an indicative, yet non-limiting example, in the attached tables of drawings in which:

FIG. 5 is a perspective view of the tyre-changing machine according to with a further embodiment, FIG. 6 is a side view of the tool according to an additional embodiment in use in the tyre-changing machine in FIG. 5, and FIGS. 7 and 8 are rear views of the tool in use on the machine in FIG. 5 wherein the hooked end is movable between a starting position and an inclined position.

DETAILED DESCRIPTION

Figure 1:
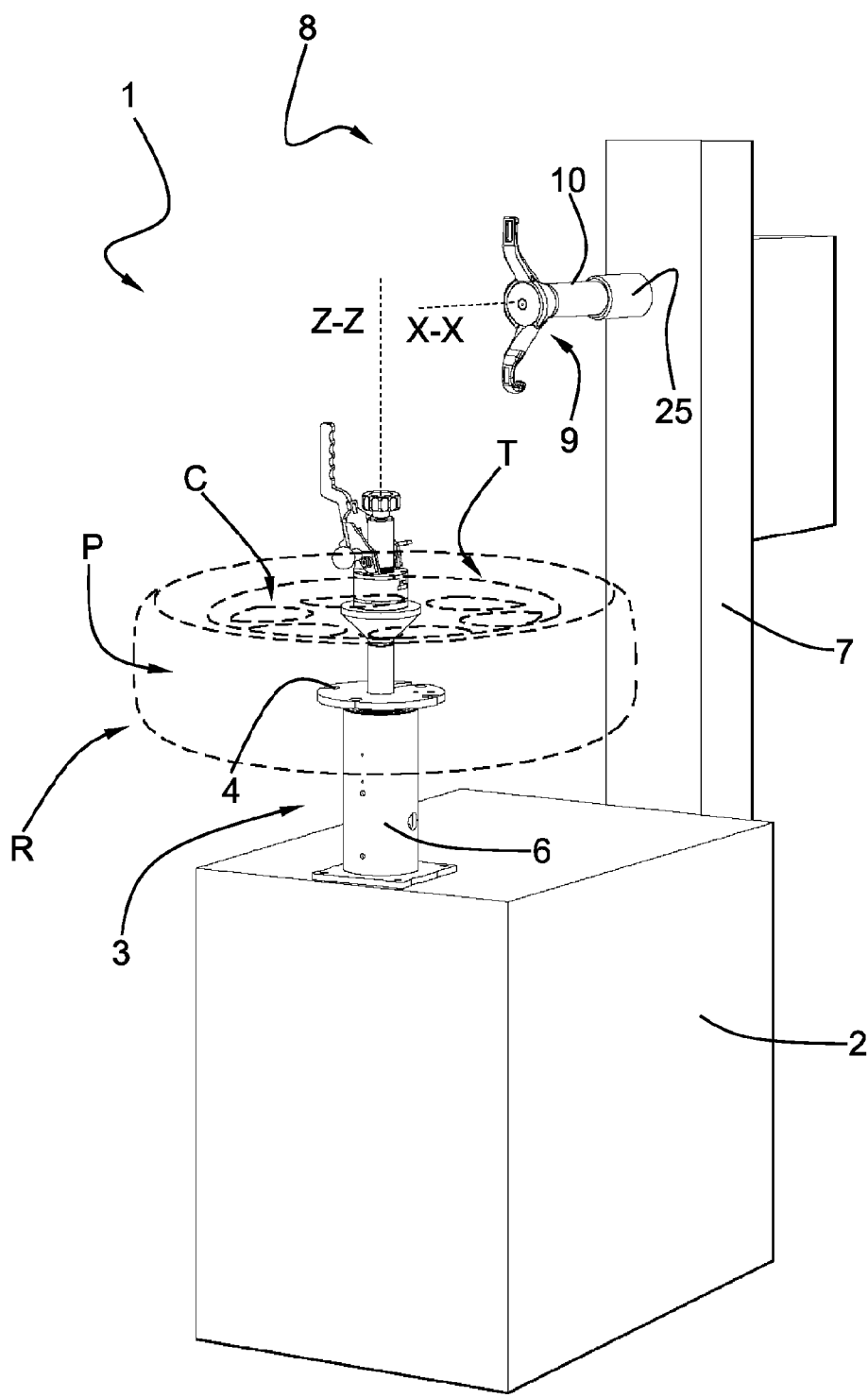
FIG. 1 is a perspective view of the tyre-changing machine according to the present invention, in one of its operative configuration.

With particular reference to these figures, reference numeral 1 globally indicates the tyre-changing machine of the invention.

The proposed machine 1 comprises first of all a basic structure 2 that can rest on the ground and a retaining and rotation unit 3 to retain and set the rim C of a wheel R in rotation around an axis of rotation of the wheel Z-Z. The retaining and rotation unit 3 is preferably mounted above an upper part of the structure 2 itself. In detail, the retaining and rotation unit 3 comprises means of rotation, in the form of a small plate 4 or a self-centering disk 5, intended to support the wheel R during the replacement and/or maintenance operations of the wheel R itself. The means of rotation 4, 5 are preferably set in rotation by a central shaft 6 which protrudes above the structure 2.

Preferably, the shaft 6 is rotated by a gearmotor assembly (not shown) arranged in an internal volume of the structure 2. A special motor, also comprised in this internal volume, drives the gearmotor and, consequently, the means of rotation 4, 5.

Figure 2:
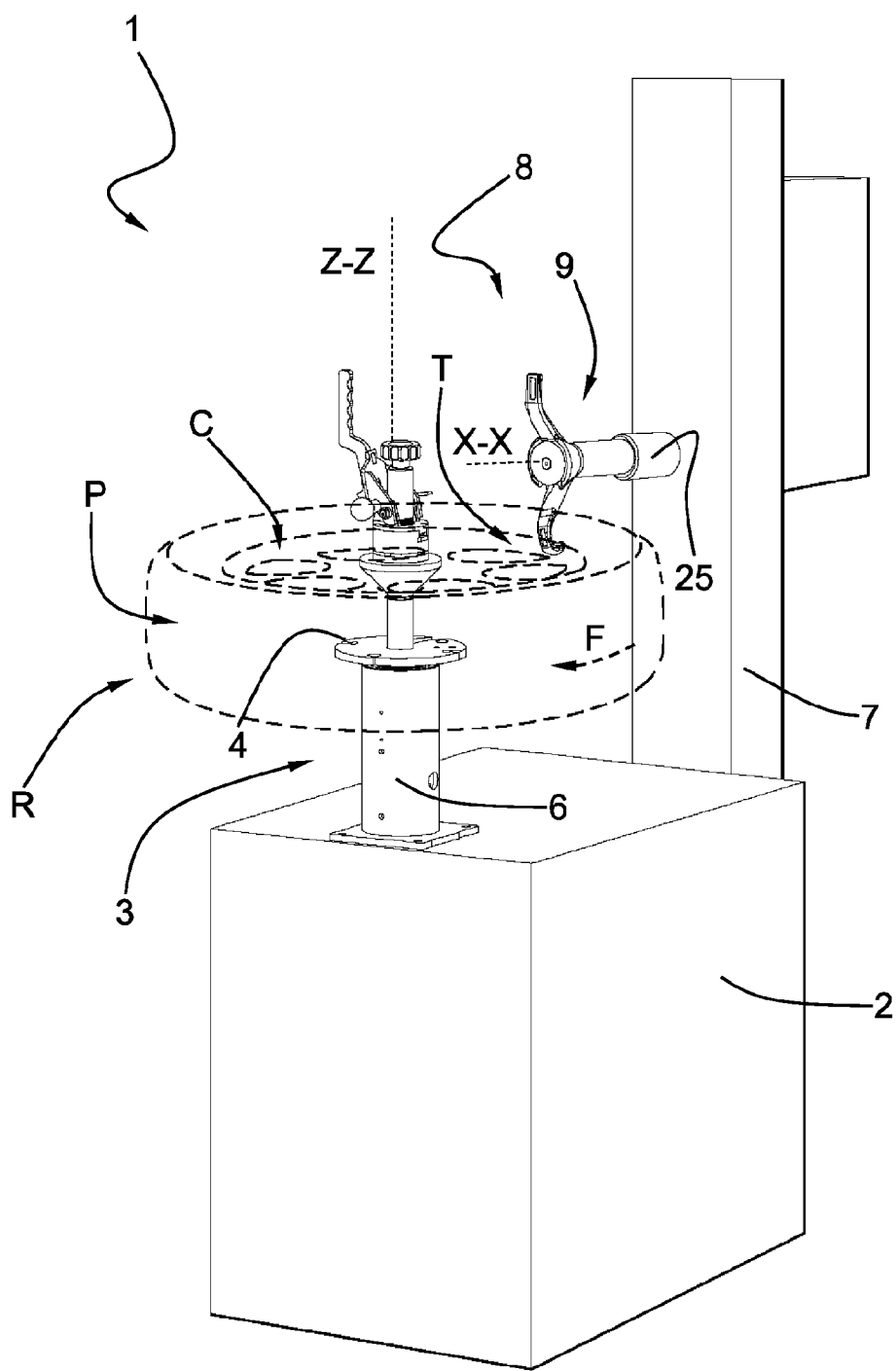
FIG. 2 is a view of the previous figure, wherein the machine is shown in a different operative configuration.

The machine 1 comprises a holding column 7, placed behind the retaining and rotation unit 3, and extended vertically and parallel to the direction of rotation of the wheel Z-Z. In detail, the holding column 7 is intended to support a tool 8. According to a first embodiment of the invention shown in FIGS. 1-4, the holding column 7 is of the fixed type and the supports the tool 8 vertically movable between a first raised position (see FIG. 1), wherein it is moved away from the retaining and rotation unit 3, and an engagement position, wherein the tool 8 is lowered (FIG. 2) closer to the unit 3.

An extensible arm 25 is provided between the tool 8 and the holding column 7, which can be extended along a direction X-X orthogonally to the axis of rotation of the wheel Z-Z to bring the tool 8 closer to/away from the wheel R in a radial direction.

By means of the movements along the directions X-X and Z-Z, then, the tool 8 may be moved relative to the wheel X and make it interact with the bead T to pull it out of the rim C. Preferably, the holding column 7 extends parallel relative to the direction of rotation of the wheel Z-Z to support the tool 8 which is intended to assemble/remove a tyre P onto/from the rim C of the wheel R.

Advantageously, the tool 8 comprises a hooked end 9 intended to carry out the removal operations of the bead T from the rim C. In particular, the hooked end 9 is intended to fit at least partly between the rim C of the wheel R and the bead T of the tyre P for the removal of the tyre P in a known manner. Specifically, when the tool 8 is lowered when approaching the unit 3, the hooked end 9 is inserted between the rim C of the wheel R and the bead T so that, when the tool 8 is next lifted, the bead T, at the removal point, is lifted and exits at least partly from the rim C above a ring-shaped flap of the rim itself. After the bead T of the tyre P has been pulled out at the removal point, the wheel R is set in rotation around its own axis Z-Z to force the bead T out of the rim C through all its 360°. As will be extensively described later in the present description, the hooked end 9 can rotate passively around an axis of rotation X-X orthogonal to the axis of rotation of the wheel Z-Z.

In the present discussion, the expression "can rotate passively" means that the hooked end 9 can rotate around the axis of rotation X-X due to the drag induced by the wheel R when the latter is set in rotation.

In actual facts, when the hooked end 9 is in contact with the bead T and the wheel R is set in rotation by the retaining and rotation unit 3, the friction force between the hooked end 9 and the bead T determines the rotation of the hooked end 9 around the axis of rotation X-X.

Conveniently, the axis of rotation X-X is incident to the axis of rotation of the wheel Z-Z, i.e., the axis of rotation X-X of the hooked end 9 and the axis of rotation of the wheel Z-Z meet at one point.

In detail, the tool 8 comprises a supporting element 10, preferably cylindrical, which extends longitudinally and overall along its own axial direction. A first ending part 11 of the supporting element 10 is coaxially locked together to a pin 12 that is intended to be directly connected to the holding column 7.

Conveniently, a second ending part 13 of the cylindrical supporting element 10, opposite the rust one 11, has a calyx portion 14 from the wall 15 of which a flattened end 16 overhangs transversely, relative to the axis X-X, and is extended radially over a predetermined length.

In use, the tool 8 is oriented so that the flattened end 16 is substantially facing upwards, parallel to the direction of rotation of the wheel Z-Z.

Figure 3B:
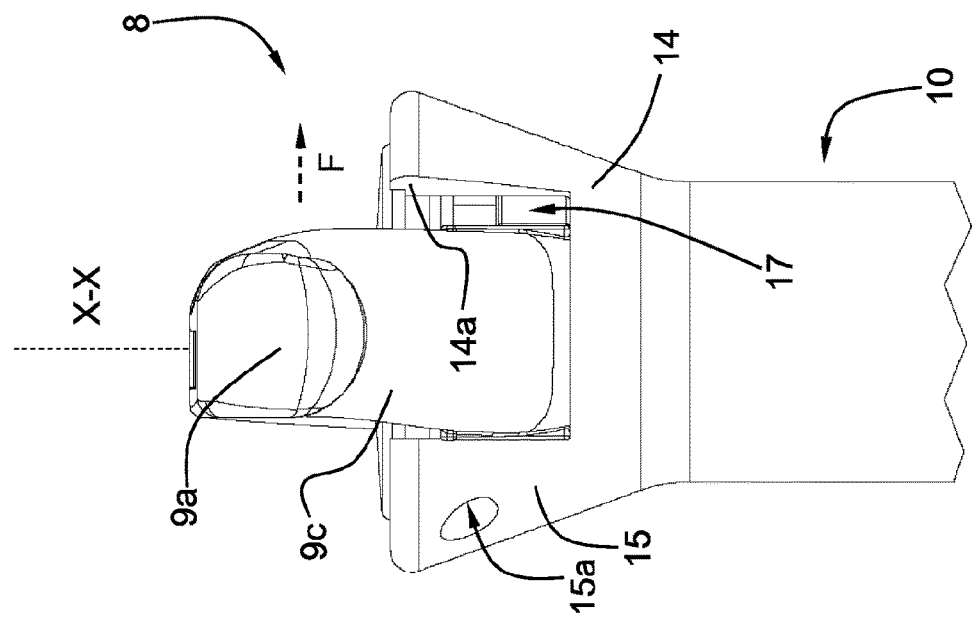
FIG. 3b is a view from below of the tool in FIG. 3a, FIGS. 4a and 4b are front views of the tool according to the invention wherein the hooked end is movable between an initial position and an inclined position.

As shown in the example in FIG. 3b, the calyx portion 14 of the cylindrical supporting element 10 is shaped so that it has an opening 17 formed in the wall 15 in a diametrically opposite position to the flattened end 16. Conveniently, the opening 17 has an angular opening cut in the wall 15 comprised between 50° and 90°, preferably 70°, the bisector of which is substantially coincident with the radial direction of extension of the flattened end 16.

Figure 3A:
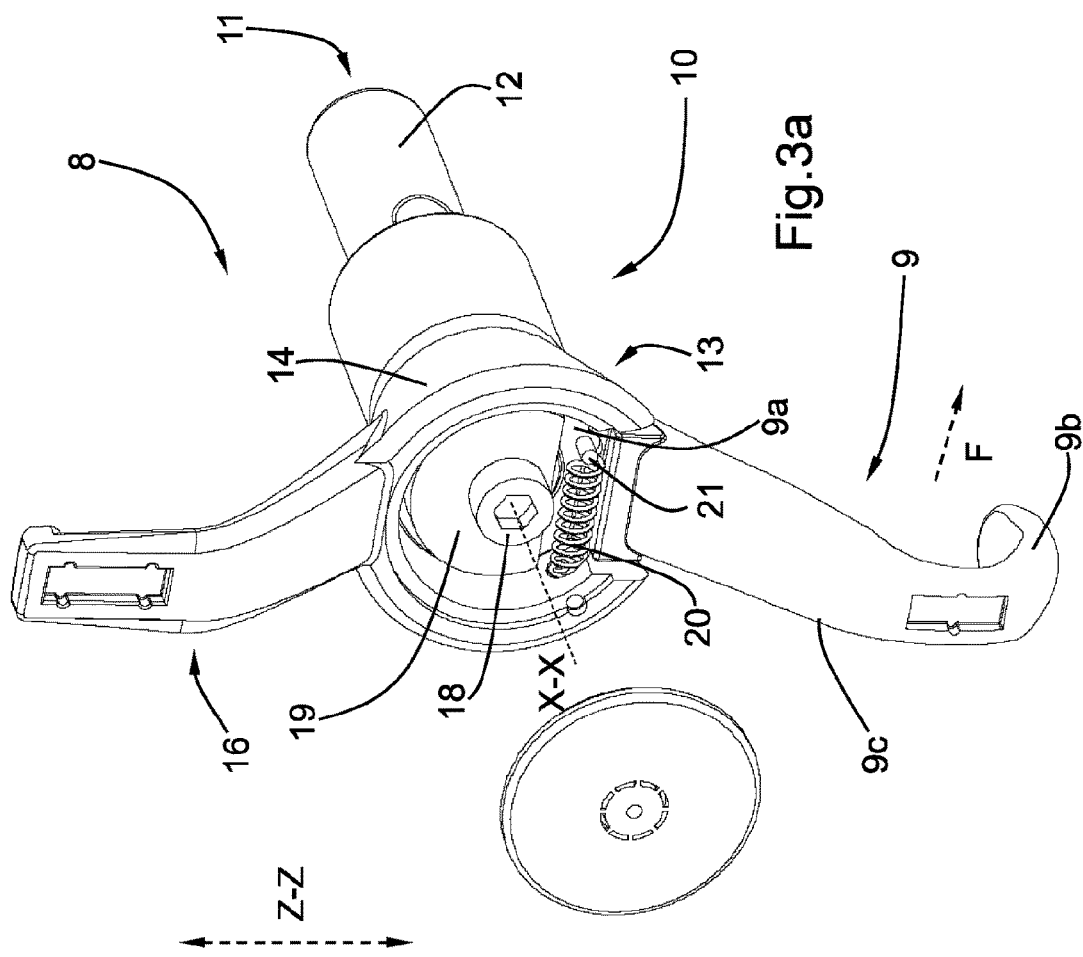
FIG. 3a is a perspective view of the tool according to the invention in use in the tyre-changing machine in FIGS. 1 and 2.
Figure 4B:
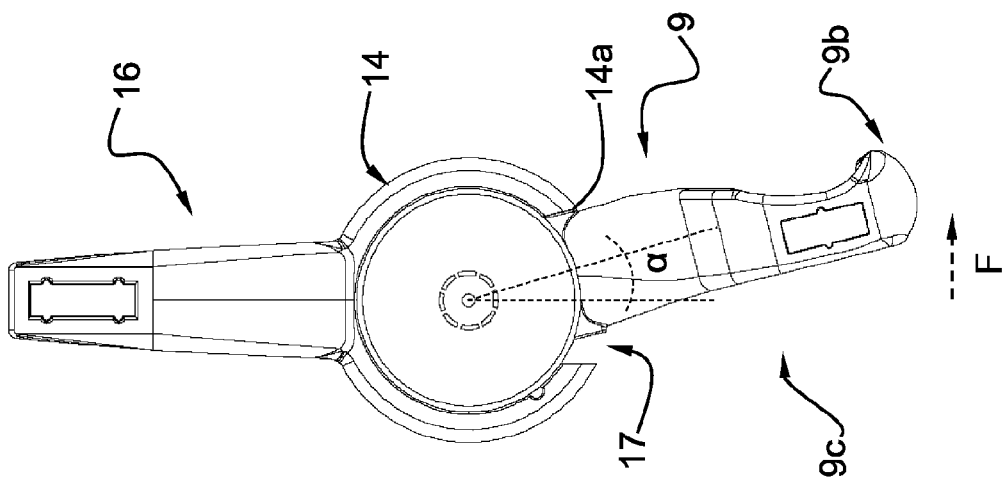
Figure 4A:
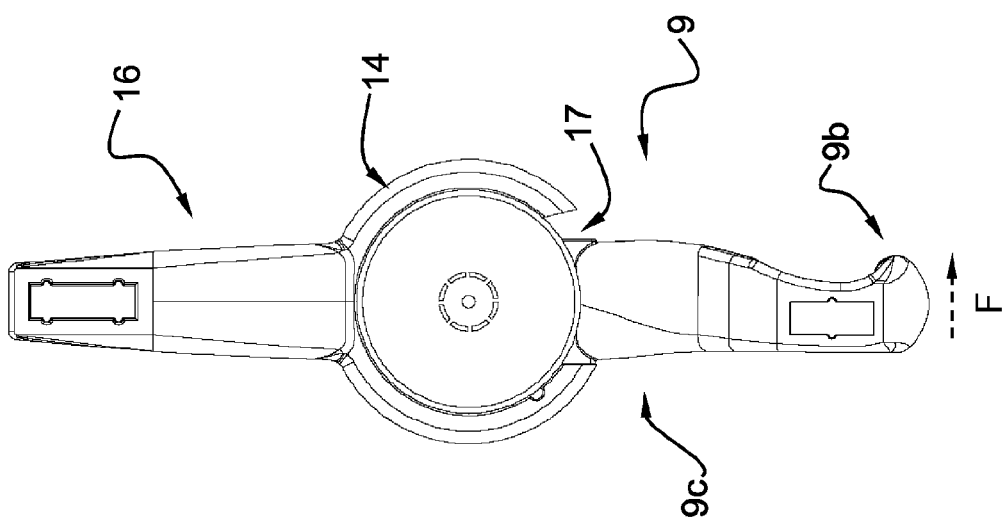

As shown in the example in FIG. 3a, the hooked end 9 projects radially from the cylindrical supporting element 10 and extends in the diametrically opposite direction to the direction of extension of the flattened end 16. In detail, the hooked end 9 comprises a ring-shaped head portion 9a connected to a nail 9b by means of a central connecting stem 9c. The ring-shaped head portion 9a is intended to be contained, by shape coupling, in the calyx portion 14 so that the stem 9c protrudes out of the opening 17 of the calyx portion 14. Thus, as mentioned above, in order to reduce the stress on the bead T during the setting in rotation of the wheel R, the hooked end 9 of the tool 8 can rotate passively around the axis X-X, the latter being essentially orthogonal and incident to the axis of rotation of the wheel Z-Z.

Advantageously, the width of the stem 9c of the hooked end 9 can be sized relative to the width of the opening 17 to increase or decrease the angle of rotation of the hooked end 9. In particular, as shown in the example in FIGS. 4a and 4b, the hooked end 9 is rotatable between an initial position, in which it is oriented along an initial direction substantially parallel to the axis of rotation of the wheel Z-Z. and an inclined position in which the hooked end 9 is rotated by an angle a comprised between 1° and 20°, preferably comprised between 8° and 16°, better equal to 14°, relative to its initial position. It should also be specified that the inclination of the hooked end 9 cannot exceed a certain degree relative to its initial position, since the stem 9c is locked in rotation at the inner corner 14a of the calyx 14 (FIGS. 3b and 4b), which acts as the end stop. In actual facts, the angle that the hooked end 9 actually takes on during use is determined by the shape of the wheel R (in particular the bead T) and by the friction forces that are established between the hooked end 9 and the bead T when the wheel R is set in rotation, but cannot go beyond the inner corner 14a.

In use, when the hooked end 9 is in its initial position, it is oriented downwards and vertically in the direction of the wheel R so that it can be inserted, at least partly, between the rim C of the wheel R and the bead T of the tyre P. To pull out of the rim C the portion of the bead T affected by the tool, the hooked end 9 is moved away from the wheel R (i.e. lifted above the upper edge of the rim) and then the wheel R is set in rotation around its own axis Z-Z (e.g., in the direction indicated by the arrow F in the figures, clockwise relative to the point of view of an observer in front of the holding column 7). Since the hooked end 9 is free to rotate between the initial position and the inclined position, the rotary movement of the wheel R, combined with the friction generated at the removal point of the bead T, produces a force that operates on the hooked end 9 causing it to tilt the latter towards the inclined position.

Substantially, during the rotation of the wheel R, the edge of the bead T of the tyre P is less stressed because the hooked end 9, according to the invention, does not hinder the smoothness of the bead T due to the possibility of adapting its inclination depending on the increase or decrease of the friction forces.

Preferably, the hooked end 9 is free to rotate between the initial position and the inclined position when it is fitted at least partly between the rim C of the wheel R and the bead T of the tyre P.

Preferably, the ring-shaped head portion 9a is idle coupled to the calyx portion 14. In particular, the coupling is achieved by means of a screw 18 that can be screwed into a recess formed in the bottom of the calyx portion 14. In one version, a washer 19 can be provided between the head of the screw 18 and the ring-shaped head portion 9a to facilitate the rotation of the hooked end 9.

According to a version of the present invention, the tool 8 can be provided with elastic return means 20 to counteract the rotation of the hooked end 9 from the initial position to the inclined position during the rotation of the wheel R. In particular, as shown in the example shown in FIG. 3a, the calyx portion 14 contains a spring, or similar elastic element, intended to make the tool 8 return to its initial position. In detail, the spring 20 is connected between the ring-shaped head portion 9a of the hooked end 9, e.g. by the presence of an overhang 21 protruding outwards from the ring-shaped portion 9a, and the wall 15 of the calyx 14 to operate on the hooked end 9. In one version, the connection of the spring 20 to the calyx portion 14 is made by means of a hole 15a obtained in the wall 15 that allows the partial containment and fixing of one end of the spring 20.

Preferably, in use, the spring 20 is arranged horizontally and transversely relative to the axis X-X in the proximity of the opening 17 and below the screw 18. For this purpose, the washer 19 can be of the semi-square type to provide a useful space to contain the spring 20 below the screw 18.

According to an additional version, the supporting element 10 can be rotated so that the entire tool 8 can be rotated in order to orient alternately either the hooked end 9 or the flattened end 16 towards the wheel R before the tool 8 moves closer to the wheel R. For this purpose, the rotation to select the end 9, 16 to be used can be done directly by an operator or automatically by means of appropriate actuators (not shown). In particular, the pin 12 can rotate by at least 180°, even making a complete turn or more in one direction or the other, so that the end 9, 16 to be used can be selected easily and quickly. Preferably, the pin 12 can be fixed to the extensible arm 25 by means of a bayonet coupling or the like to allow a discrete rotation of half a turn at a time.

According to a second embodiment of the invention shown in FIGS. 5-8, the holding column 7, associated with the basic structure 2 and with the retaining/rotation unit 3, can be provided with a movable tool holding arm 21 approaching from and towards the self-centering disk 5 and oriented overall parallel to the direction Z-Z of rotation of the wheel R. The tool holding arm 21 can be moved three-dimensionally according to known techniques and can support, in use, at its lower end, the hooked end 9 according to the present invention.

As illustrated in the examples in FIGS. 7 and 8, the hooked end 9 is supported to move between the initial position and the inclined position in a manner similar to what described with reference to the first embodiment of the invention.

According to one version, the tool holding arm 21 comprises, at its lower end, a supporting plate 22 to receive the ring-shaped head portion 9a of the hooked end 9 that can be constrained to the supporting element 10. In detail, in this second embodiment, the supporting element 10 is made up of a pair of side plates 22a, 22b extended vertically and parallel to the direction Z-Z and positioned on opposite sides to the free end of the arm 21. In detail, the supporting plate 22 is supported transversely by the side plates 22a, 22b within which a space is created within which the rotation of the hooked end 9 is limited between the initial position and the inclined position. The hooked end 9 is thus able to rotate around the axis X-X of the ring-shaped head portion 9a by an angle b comprised between 1° and 20°, preferably comprised between 8° and 16°, better equal to 14°. When the wheel R turns in the direction of rotation indicated by the arrow F, the friction generated at the removal point of the bead T produces a force that operates on the hooked end 9, particularly in the area comprised between the stem 9c and the nail 9b, thus causing the latter to tilt towards the inclined position, as shown in the example in FIG. 8. It should also be specified that the inclination of the hooked end 9 cannot exceed a certain degree relative to the initial position, because the stem 9c is blocked in rotation by the inner surface of the side plate 22a (FIG. 8), which acts as the end stop. In actual facts, the angle that the hooked end 9 actually takes on during use is determined by the shape of the wheel R (in particular the bead T) and by the friction forces that occur between the hooked end 9 and the bead T when the wheel R is set in rotation, but cannot go beyond the side plate 22a.

According to one version, the hooked end 9 can be inclined further around an axis Y-Y orthogonal to the axis of rotation of the wheel Z-Z and orthogonal to the axis of rotation of the tool X-X (FIG. 5). This way, advantageously, it is also possible to let the hooked end 9 rotate around the upper edge of the rim C, to reduce the stress on the bead T when inserting the hooked end 9 between the rim C and the bead T and removing the bead T.

According to an additional version, the tool 8 can comprise guidance means 23 which allow the hooked end 9 to move away from the supporting element 10, and thus from the plates 22a, 22b, in order to approach the wheel R along a direction which is substantially parallel to the axis of rotation of the wheel Z-Z. In detail, as shown in the example in FIG. 6, the guidance means 23 preferably comprise a respective slot 23a cut in each side plate 22a. 22b to allow the supporting plate 22, by means of appropriate small cylinders 23b sliding on the slots 23a, to move between a backward position, wherein the hooked end 9 is in a proximal position to the supporting element 10 (and therefore to the plates 22a, 22b), and a distal position wherein the hooked end 9 is at least partly moved forward relative to the supporting element 10 and away from the latter to move towards the wheel R and parallel to the direction Z-Z.

Preferably, each slot 23a can have a substantially straight or curved pattern. In the latter case, the curved pattern of the slots 23a can also allow the hooked end 9, and more specifically the axis of rotation X-X, to carry out the rotary movement around the axis Y-Y described above and/or a deviation along X-X. In other words, the shape of the slots 23a can result in a rotary-shifting motion (along Z-Z and X-X and around Y-Y).

As a result, the hooked end 9 can combine several different and numerous movements on the three axes X-X. Y-Y. Z-Z to reduce the tension of the bead T, both during the removal of the bead T above the upper edge of the rim C (due to the shape of the slots 23a) and during the setting in rotation of the wheel R (due to the rotation of the hooked end 9 around the axis of rotation X-X, which follows through the friction forces created between the hooked end 9 and the bead T).

Figure 8:
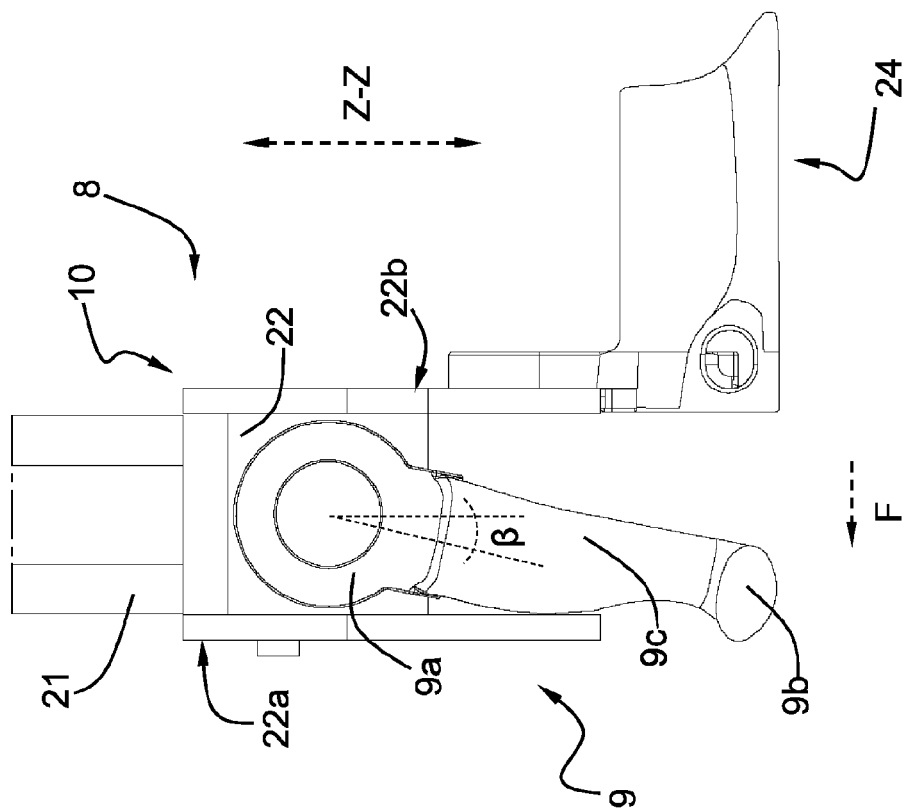
Figure 7:
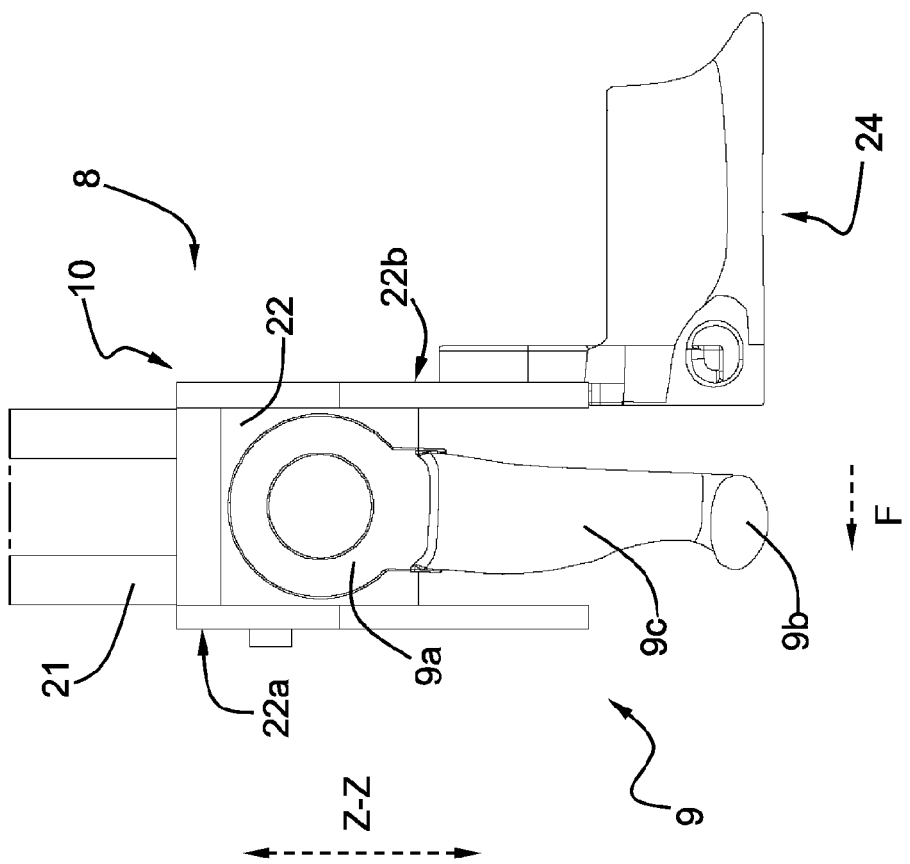

With reference to the examples shown in FIGS. 7-9, it is possible to optionally provide for a sided element 24 fixed to the plate 22b. It has a substantially curved profile, with a curvature similar to that of a ring-shaped portion of the rim C, in order to improve the lifting of the bead T and to accompany the coming out of the bead T itself during the rotation of the wheel R working in combination with the hooked end 9.

As it has been possible to verify from the present description, it has been noticed that the described invention achieves the intended objects and in particular the fact is underlined that through the tool for tyre-changing machines according to the invention it is possible to operate in a more delicate manner on the bead facilitating the coming out of the tyre and helping, at the same time, the operator to speed up and therefore reduce the working time during the disassembly operations of a tyre.

The invention claimed is:

1. A tyre-changing machine comprising:
   a basic structure that can rest on the ground,
   a retaining and rotation unit mounted on an upper part of the basic structure and adapted to retain and set the rim (C) of a wheel (R) in rotation around an axis of rotation of the wheel (Z-Z),
   a holding column associated with the retaining and rotation unit and intended to support a tool for mounting/disassembling a tyre (P) onto/from the rim (C) of the wheel (R),
   wherein the tool comprises a hooked end which can rotate passively around an axis of rotation (X-X) which is incident to and orthogonal to the axis of rotation of the wheel (Z-Z).

2. The machine according to claim 1, wherein the hooked end is rotatable between an initial position, in which the hooked end is oriented along an initial direction substantially parallel to the axis of rotation of the wheel (Z-Z), and an inclined position in which the hooked end is rotated by an angle (a) comprised between 1° and 20° relative to its initial position.

3. The machine according to claim 2, wherein the hooked end is free to rotate between the initial position and the inclined position when it is fitted at least partly between the rim (C) of the wheel (R) and the bead (T) of the tyre (P).

4. The machine according to claim 1, further comprising elastic return means associated with the hooked end to counteract the movement of the latter from the initial position to the inclined position during the rotation of the wheel (R).

5. The machine according to claim 1, in which the tool comprises a flattened end overhanging in the diametrically opposite direction to the direction of extension of the hooked end.

6. The machine according to claim 5, wherein the hooked end and the flattened end are mounted on a supporting element which can be rotated relative to the holding column around the axis of rotation (X-X).

7. The machine according to claim 6, in which the supporting element can be rotated by 180° to orient alternately either the hooked end or the flattened end towards the wheel (R) before the tool moves closer to the wheel (R).

8. The machine according to claim 6, in which the tool comprises guidance means which allow the hooked end to move away from the supporting element in order to approach the wheel (R) along a direction which is substantially parallel to the axis of rotation of the wheel (Z-Z).

9. The machine according to claim 1, in which the hooked end can be rotated further around an axis (Y-Y) orthogonal to the axis of rotation of the wheel (Z-Z) and orthogonal to the axis of rotation of the tool (X-X).

10. A tyre-changing machine comprising:
    a basic structure that can rest on the ground,
    a retaining and rotation unit mounted on an upper part of the basic structure and adapted to retain and set the rim (C) of a wheel (R) in rotation around an axis of rotation of the wheel (Z-Z),
    a holding column associated with the retaining and rotation unit and intended to support a tool for mounting/disassembling a tyre (P) onto/from the rim (C) of the wheel (R),
    wherein the tool comprises a hooked end which can rotate passively around an axis of rotation (X-X) orthogonal to the axis of rotation of the wheel (Z-Z), and in which the tool comprises a flattened end overhanging in the diametrically opposite direction to the direction of extension of the hooked end.

11. A tyre-changing machine comprising:
    a basic structure that can rest on the ground,
    a retaining and rotation unit mounted on an upper part of the basic structure and adapted to retain and set the rim (C) of a wheel (R) in rotation around an axis of rotation of the wheel (Z-Z),
    a holding column associated with the retaining and rotation unit and intended to support a tool for mounting/disassembling a tyre (P) onto/from the rim (C) of the wheel (R),
    wherein the tool comprises a hooked end which can rotate passively around an axis of rotation (X-X) orthogonal to the axis of rotation of the wheel (Z-Z),
    and in which the hooked end can be rotated further around an axis (Y-Y) orthogonal to the axis of rotation of the wheel (Z-Z) and orthogonal to the axis of rotation of the tool (X-X).

* * * * *